(12) United States Patent
Bucking et al.

(10) Patent No.: US 9,212,700 B1
(45) Date of Patent: Dec. 15, 2015

(54) HIGH EFFICIENCY AND DURABLE BALL BEARING SYSTEM WITH REDUCED TURBINE END HEAT TRANSFER

(71) Applicant: BorgWarner Inc., Auburn Hills, MI (US)

(72) Inventors: Michael Bucking, Asheville, NC (US); Raj Chandramohanan, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/573,775

(22) Filed: Dec. 17, 2014

(51) Int. Cl.
*F16C 37/00* (2006.01)
*F16C 33/66* (2006.01)
*F02C 6/12* (2006.01)

(52) U.S. Cl.
CPC ............... *F16C 37/007* (2013.01); *F02C 6/12* (2013.01); *F16C 33/6681* (2013.01)

(58) Field of Classification Search
CPC ....... F04D 29/05; F04D 29/056; F04D 29/04; F04D 29/046; F04D 29/06; F04D 29/10; F04D 29/102; F01D 25/125; F16C 37/007; F05D 2260/6022
See application file for complete search history.

(56) References Cited

U.S. PATENT DOCUMENTS

| 5,087,176 A | * | 2/1992 | Wieland | 417/407 |
| 5,890,881 A | * | 4/1999 | Adeff | 417/407 |
| 8,413,435 B2 | * | 4/2013 | Sloss et al. | 60/323 |
| 2008/0133110 A1 | | 6/2008 | Vetrovec | |
| 2008/0246281 A1 | | 10/2008 | Agrawal et al. | |

FOREIGN PATENT DOCUMENTS

| JP | 2007009702 A | 1/2007 |
| WO | 2013085766 A1 | 6/2013 |
| WO | 2014080501 A1 | 5/2014 |

* cited by examiner

*Primary Examiner* — Nathaniel Wiehe
*Assistant Examiner* — Michael Sehn
(74) *Attorney, Agent, or Firm* — BrooksGroup

(57) ABSTRACT

A product for use with a turbocharger is disclosed. According to a number of variations, the product may include a bearing housing with a bearing assembly positioned in the bearing housing. A shaft may extend through the bearing assembly for rotation. A turbine wheel may be exposed to high temperature exhaust gases and may be connected to the shaft. The product may include a number of features to manage heat transfer and protect the bearing assembly from excessive temperatures that may otherwise result from exposure to the exhaust gases.

16 Claims, 3 Drawing Sheets

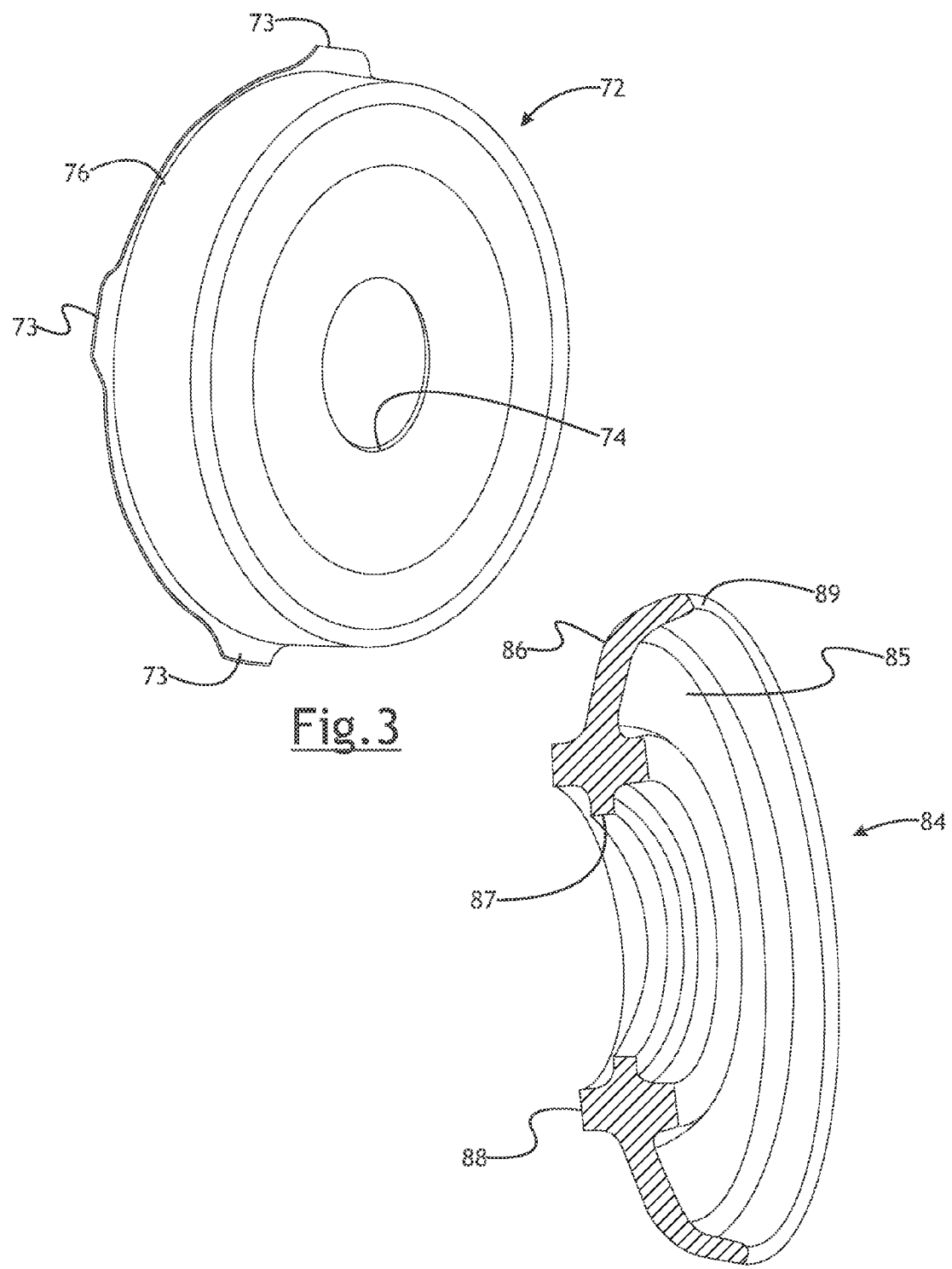

US 9,212,700 B1

HIGH EFFICIENCY AND DURABLE BALL BEARING SYSTEM WITH REDUCED TURBINE END HEAT TRANSFER

TECHNICAL FIELD

The field to which the disclosure generally relates includes turbocharger systems and in particular, to turbochargers with lubricated bearing assemblies.

BACKGROUND

A turbocharger typically consists of a compressor driven by a turbine. The turbine may be connected to the compressor by a common shaft that is supported for rotation by bearings. The turbocharger, the shaft and the turbine wheel may rotate at speeds that approach hundreds of thousands of revolutions per minute. In addition, the turbine wheel operates in a high temperature exhaust gas environment, wherein heat may be transferred to the turbocharger components. Under these harsh and increasingly demanding operating conditions, the lifespan of a turbocharger is expected to match that of the engine with which it operates. To accomplish that challenge, the design of a turbocharger and its components must be robust to survive as expected, while still being cost effective.

SUMMARY OF ILLUSTRATIVE VARIATIONS

A product for use with a turbocharger system according to a number of variations may include a bearing housing, with a bearing assembly positioned in the bearing housing. A shaft may extend through the bearing assembly for rotational support in the bearing housing. A turbine wheel may be exposed to high temperature exhaust gases and may be connected to the shaft. The product may include a number of features to manage heat transfer and protect the bearing assembly from excessive temperatures that may result from exposure to the exhaust gases.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 3 is an isometric view of a heat shield according to a number of variations.

FIG. 4 is an isometric view of a sectioned, turbine end oil flinger according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
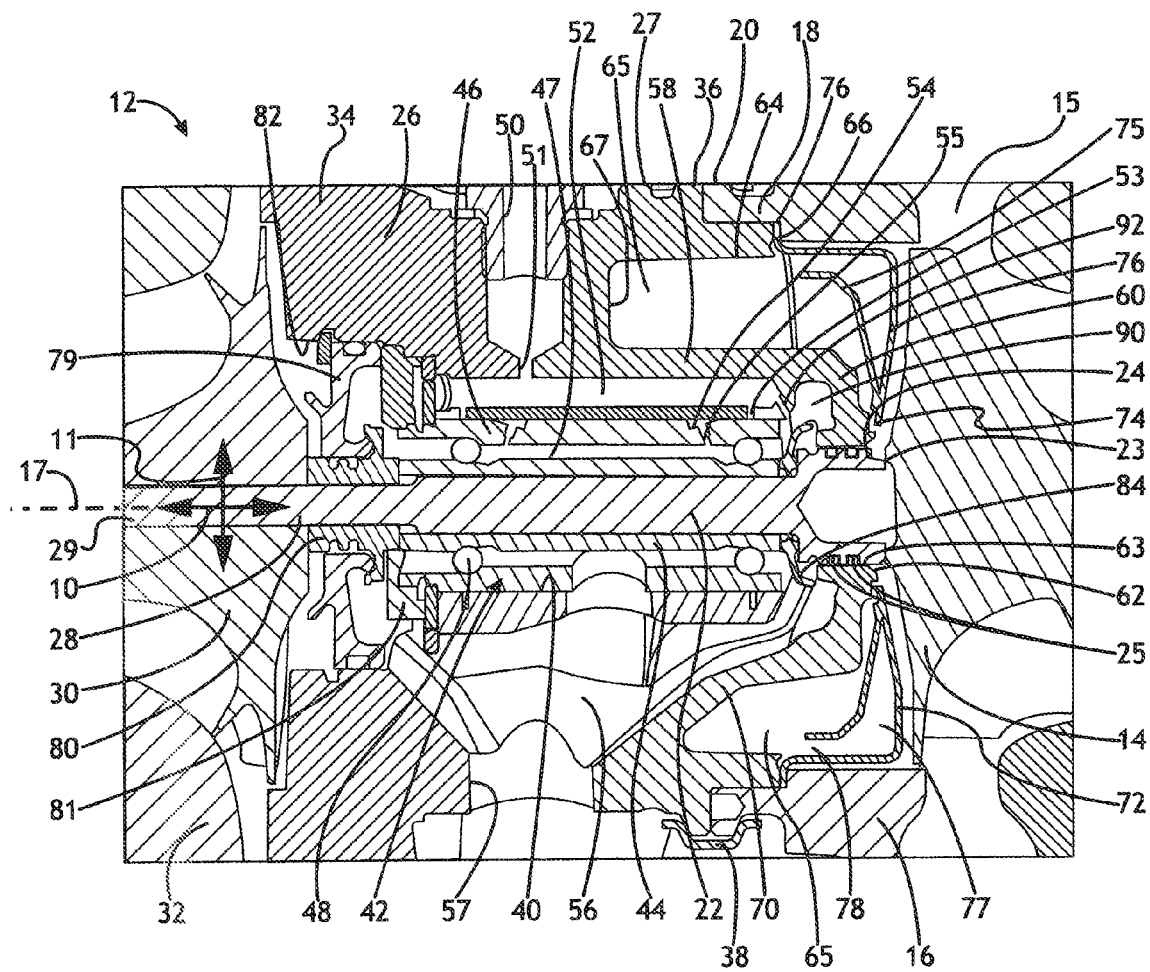
FIG. 1 is a fragmentary cross sectional illustration of a product for use with a turbocharger system according to a number of variations.

In the description associated with FIG. 1, elements may be described in relation to the direction in which parts extend. In this regard, reference number 10 indicates a line that extends in the axial direction through the shaft and wheel centerline, which coincides with left and right in the view of FIG. 1. The line indicating the axial direction 10 is shown coinciding with a central axis 17 of the product 12. An axial extending part will extend on a line parallel to, or on, the central axis 17. Reference numeral 11 indicates a line that extends in the radial direction, which means toward or away from the central axis 17, and generally vertical as viewed in FIG. 1.

In the product 12, which may be used with a turbocharger system for an internal combustion engine and in particular, with a turbocharger core or cartridge assembly, a turbine wheel 14 as shown in FIG. 1 may exist in a continuous high velocity jet of exhaust gases entering through the volute 15 when the engine is running. The volute 15 may be defined by a turbine housing 16, which includes an axially extending flange 18 that terminates at a radially outward extending flange 20. The turbine wheel 14 may be connected to a shaft 22. The shaft 22 may include an enlarged segment at or near an end 23 forming a bearing segment 24. The bearing segment 24 may have a number of annular grooves holding seal rings 25. The shaft 22 may extend in the axial direction 10 along the central axis 17, and through a center housing referred to as the bearing housing 26. The shaft 22 may include a reduced segment at or near an end 29 and may be connected to a compressor wheel 30. The compressor wheel 30 may rotate with the shaft 22 and turbine wheel 14. The compressor wheel 30 may be disposed to rotate in a compressor housing 32.

The bearing housing 26 may include a flange 34 on the compressor side, which extends outwardly in the radially direction 11 and may be configured for connection to the compressor housing 32. A number of fasteners (not shown), may be used to secure the bearing housing 26 to the compressor housing 32. The bearing housing 26 may also have a flange 36 on the turbine side, which may be configured to mate with the flange 20 of the turbine housing 16. A band clamp 38 may be used to secure the bearing housing 26 to the turbine housing 16.

An opening may be provided in the bearing housing 26 about the central axis 17 forming a bearing cavity 40. The bearing cavity 40 may extend along the central axis 17 and around the shaft 22. A bearing assembly 42 may be positioned in the bearing cavity 40 and may include an inner race 44 and an outer race 46. The inner race 44 may have a hollow, substantially cylindrical shape and may closely fit over the shaft 22 around a bearing segment thereof. The outer race may also have a hollow, substantially cylindrical shape and may fit closely within the bearing cavity 40. A cylindrically shaped gap 47 may be provided between the inner race 44 and the outer race 46, with annular grooves in the inner and outer races carrying a number of ball bearings 48 so that the inner and outer races may freely rotate relative to one another.

The bearing assembly 42 may be lubricated, and an oil delivery system may be provided with a supply line at fitting 50, which may be interconnected with an associated engine's pressurized oil delivery system. The bearing assembly may be provided with a supply of oil through bore 51 which extends in the radial direction 11, and through the interconnected bore 52, which extends in the axial direction 10 alongside the bearing cavity 40. The bore 52 may be intersected by a number of annular grooves 53 that extend around the central axis 17 interconnecting the bore 52 with the bearing cavity 40. In addition, a number of angled grooves 54 may be formed in the outer surface of the outer race 46 with intersecting oil jets 55 that open to the gap 47, to supply oil to the ball bearings 48.

The bearing housing 26 may have an oil collection cavity 56 with an oil drain 57 to return oil to the associated engine.

The bearing housing 26 may have a first wall section 58 extending axially toward the turbine wheel 14 and extending around the circumference of the bearing cavity 40. The first wall section 58 may turn radially inward and connect with a turbine end spacer wall 60 that surrounds the turbine end of the of the bearing housing 26 and helps define a cavity which is described later. The turbine end spacer wall 60 may include an annular ring segment 62 that defines an end opening 63 in the turbine end spacer wall 60 about the central axis 17 that opens to the bearing cavity 40. The bearing segment 24 of the shaft 22 may be positioned in the end opening 63 and may rotate therein. The bearing housing 26 may include a second wall section 64 that may extend in the axial direction toward the turbine wheel and that may also extend around the circumference of the first wall section 58. The second wall section 64 may have a terminal end 66. A cavity forming an air dam 65 may be defined in the radial direction 11 between the first wall section 58 and the second wall section 64. The air dam 65 may have an end wall 67 on a side toward the compressor wheel 30, and may open toward the turbine wheel 14. The air dam 65 may extend around the central axis 17 in a generally annular shape configured to remain separated from the oil collection cavity 56 by a wall section 70.

Figure 2:
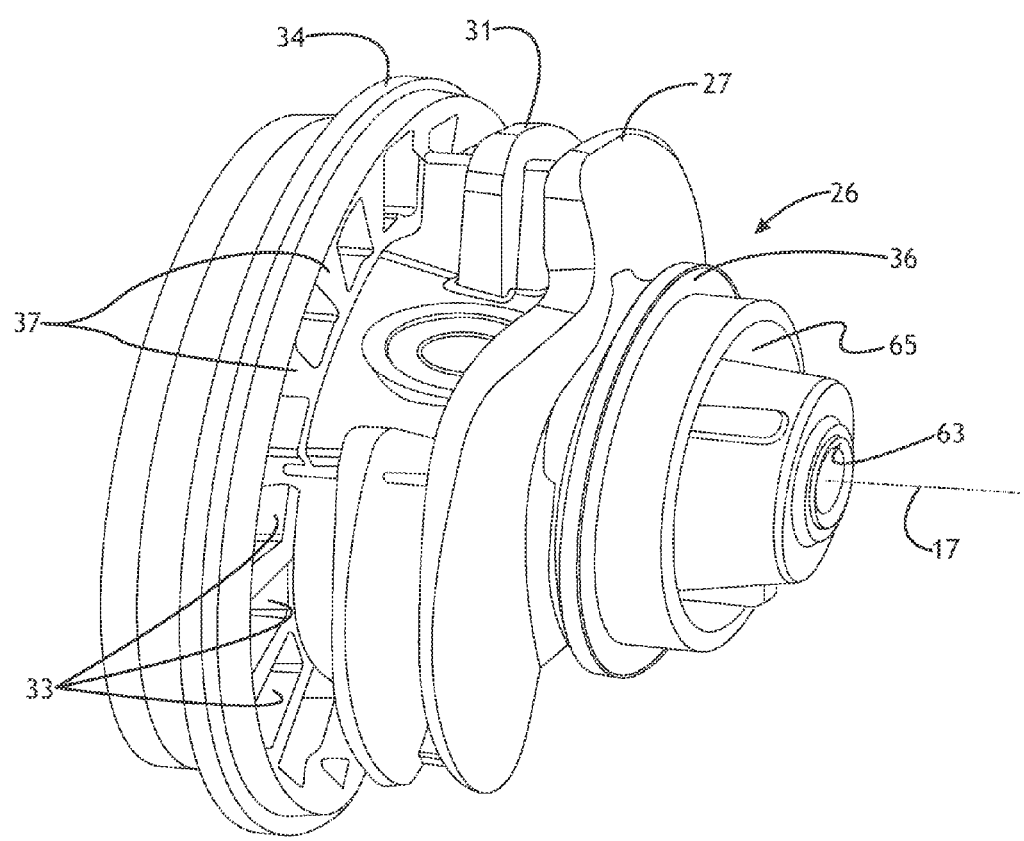
FIG. 2 is an isometric view of a bearing housing according to a number of variations.

Referring additionally to FIG. 2, the bearing housing 26 may include a cooling fin 27 that is spaced apart from the flange 36 and may extend away from the bearing housing 26 in the radial direction. The cooling fin 27 may extend around a majority of the circumference of the bearing housing 26. Another cooling fin 31 may be spaced apart from the cooling fin 27 and may extend away from the bearing housing 26 in the radial direction and may extend around a majority of the circumference of the bearing housing 26. The fins 27, 31 may provide for the transfer of heat out of the bearing housing 26. In addition, a number of cooling pockets 33 may be formed around a majority of the circumference of flange 34 forming ribs 37 between adjacent pockets 33. The cooling pockets may be open in the direction of the turbine wheel 14 and in combination with the fins 27, 31 may provide for the transfer of heat out of the bearing housing 26. As shown in FIG. 1, the fin 27 is positioned in the axial direction closer to the turbine wheel 14 than is the end wall 67 of air dam 65. Through this configuration, heat entering the bearing housing 26 from the turbine housing 16 is directed around air dam 65 axially through the wall section 64 and then radially outward through the cooling fin 27 and away from the bearing assembly 42.

A heat shield 72 may have an inner opening 74 through which the shaft 22 extends and may have a peripheral rim forming an outer flange 76 configured to engage with the terminal end 66 of the second wall section 64. The heat shield 72 may have an inner wall 75 and a spaced apart outer wall 76 forming an air gap 77. The heat shield may include an annular opening 78 between the air gap 77 and the air dam 65. The heat shield 72 may be formed generally in a cup shape that opens toward the air dam 65. The heat shield 72 may, in combination with the housing 26, substantially close the air dam 65. In addition to being defined between the first wall section 58 and the second wall section 64 in the radial direction 11, the air dam 65 may be defined between the end wall 67 of housing 26 and the heat shield 72 in the axial direction 10. The lubricant used in the bearing assembly 42 may be separated from the air dam 65 by the seal rings 25 that are positioned between the ring segment 62 and the bearing segment 24. Maintaining oil separation may avoid coking on the bearing housing 26 within the air dam 65, thereby avoiding a build-up that might insulate against heat transfer. The heat shield 72 is also shown in FIG. 3, where it can be seen that the outer flange 76 includes a number of tabs 73 extending radially outward. The tabs 73 are configured to minimize the contact area between the heat shield 72 and the bearing housing 26. The minimized contact area minimizes heat transfer from the heat shield 72 to the bearing housing 26.

As shown in FIG. 1, product 12 may include a compressor seal assembly disposed around the shaft 22 in opening 82. The seal assembly may include a seal ring 79 that may be seated against the bearing housing 26 and a mating ring 80 that may be disposed around the shaft 22 and that may engage the inner race 44 at its compressor end. In addition, a collar 81 may be seated against the bearing housing 26 and may engage the outer race 46 of bearing assembly 42 on the compressor end. A flinger 84 may be positioned around the shaft 22 at the turbine end of the bearing assembly 42.

The flinger 84 is also illustrated in sectioned form in FIG. 4, where it can be seen that the flinger 84 is generally annular in shape and includes a cupped section 85 that opens in the direction of the turbine wheel 14 and includes an outer rim 89. The cupped section extends radially outward and curves toward the turbine wheel 14 with a back 86 directed toward the bearing assembly 42. The flinger 84 may include an opening 87 through which the shaft 22 extends. The flinger 84 may also include an annular enlarged section 88 around the opening 87. As shown in FIG. 1, the annular enlarged section 88 may be captured between the inner race 44 of bearing assembly 42 and the bearing segment 24 of the shaft 22.

As shown in FIG. 1, the outer rim 89 of flinger 84 may extend into a generally annular cavity 90 that drains to the oil collection cavity 56. The cavity 56 may be formed radially inside the juncture of first wall section 58 and turbine end spacer wall 60. An oil jet 92 may be formed between the bore 52 and the cavity 90. The oil jet 92 may be directed at the back 86 of flinger 84 which directs oil against the wall of bearing housing 26 in the cavity 90. Heat in the area of the juncture of the first wall section 58 and the turbine end spacer wall 60 may be collected by oil from the flinger 84 and may be carried out through the drain 57. In addition to cooling the area of the cavity 90, the flinger 84 may direct oil away from the bearing segment 24 helping the seal rings 25 maintain oil separation from the turbine housing 16.

Through the foregoing variants, the amount of heat transferred away from a bearing assembly is maximized. The description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product for use with a turbocharger system and may include a bearing housing with a first flange extending in a radial direction. The first flange may be configured to connect with a compressor housing. A second flange on the bearing housing may be configured to connect with a turbine housing. A bearing cavity may extend along a central axis of the bearing housing and may be configured to receive a bearing assembly. A turbine end spacer wall of the bearing housing may extend in the radial direction and may define an end opening that opens to the bearing cavity. A first wall section of the bearing housing may extend in the axial direction toward the turbine housing and may extend around the bearing cavity. The first wall section may turn radially inward toward the central axis and may connect with the turbine end spacer wall. A second wall section may extend in the axial direction toward the turbine wheel and may extend around the first wall section. The second wall section may have a terminal end configured to engage with a heat shield. An air dam cavity may be defined between the first wall section and the second wall section. A cooling fin may be positioned between the first and second flanges. The cooling fin may extend from the housing in the radial direction away from the central axis, and may extend circumferentially around a majority of the housing.

Variation 2 may include a product according to variation 1 wherein the air dam extends into the housing from the terminal end of the second wall section toward the compressor flange and past the cooling fin.

Variation 3 may include a product according to variation 1 or 2 wherein the housing may include a second cooling fin positioned between the first and second flanges. The second cooling fin may extend from the housing in the radial direction away from the central axis, and may extend circumferentially around a majority of the housing.

Variation 4 may include a product according to any of variations 1 through 3 wherein the housing may include a number of cooling pockets that may be disposed in an annular configuration around the first flange and may be located on an outside of the housing.

Variation 5 may include a product according to any of variations 1 through 4 wherein a cavity may be defined by the bearing housing at a juncture of the first wall section and the turbine end spacer wall. The cavity may extend circumferentially around the central axis.

Variation 6 may include a product according to variation 5 wherein the bearing housing may include an oil jet that opens to the cavity and is directed an angle toward the central axis.

Variation 7 may include a product for use with a turbocharger system and may include a housing having a bearing opening. A bearing assembly may be positioned in the bearing opening and may have a central opening. A shaft may extend through the central opening and may have a first end and a second end. A compressor wheel may be fixed to the first end of the shaft, and a turbine wheel may be fixed to the second end of the shaft. The shaft may include a bearing segment near the second end. The housing may include a turbine end spacer wall defining an end opening. The bearing segment may be positioned in the end opening with a seal ring positioned between the bearing segment and the housing, inside the end opening. The housing may include a first wall section extending toward the turbine wheel and around the bearing opening. The first wall section may turn radially inward and may connect with the turbine end spacer wall. The housing may include a second wall section extending toward the turbine wheel and around the first wall section. The second wall section may have a terminal end. A heat shield may have an inner opening through which the shaft extends and may have an outer flange that is engaged with the terminal end. The heat shield may substantially close an air dam defined between the housing and the heat shield and between the first wall section and the second wall section. Oil used in the bearing assembly may be separated from the air dam by the seal ring.

Variation 8 may include a product according to variation 7 wherein the heat shield may include an inner wall disposed toward the housing and may include an outer wall disposed toward the turbine wheel. An air gap may be defined between the inner wall and the outer wall.

Variation 9 may include a product according to variation 7 or 8 wherein the flange of the heat shield may include a number of extending tabs configured to minimize a contact area between the heat shield and the housing to minimize heat transfer there between.

Variation 10 may include a product according to any of variations 7 through 9 wherein the housing may include at least one fin that extends radially outward from the housing and around the air dam. The air dam and the fin may be configured to direct heat through the second wall section and the fin and away from the bearing assembly.

Variation 11 may include a product according to any of variations 7 through 10 wherein the housing may include a number of cooling pockets that are disposed in an annular configuration and are located on an outside of the housing.

Variation 12 may include a product according to variation 10 or 11 wherein an axis is defined by a centerline of the shaft. The air dam may extend into the housing away from the turbine wheel and beyond a radially extending line that passes through the fin and the axis.

Variation 13 may include a product according to any of variations 7 through 12 and may include a flinger positioned around the shaft near the turbine end spacer wall. The flinger may include a cupped section that opens toward the turbine end spacer wall and ends at an outer rim. The cupped section may have a back, and the outer rim may be disposed in a cavity defined by the housing at a juncture of the first wall section and the turbine end spacer wall.

Variation 14 may include a product according to variation 13 wherein the housing may include an oil jet directed at the back of the cupped section of the flinger. Oil may be directed at the housing inside the cavity by the flinger thereby cooling the housing around the juncture of the first wall section and the turbine end spacer wall.

Variation 15 may include a product according to variation 13 or 14 wherein the cavity may include a drain and the flinger may be shaped to direct oil away from the bearing segment of the shaft so that oil proceeds through the drain and the air dam remains free of oil.

Variation 16 may include a product according to any of variations 13 through 15 wherein the bearing assembly may include an inner race and the flinger may include an annular section that may be enlarged and captured between the inner race and the bearing section of the shaft.

Variation 17 may include product for use with a turbocharger system and may include a bearing housing with a bearing assembly positioned in the bearing housing. The bearing assembly may be lubricated with oil. A rotatable shaft may extend through the bearing. A turbine wheel may be connected to the shaft. A cavity may be defined by the bearing housing between the bearing assembly and the turbine wheel. An oil flinger may be positioned on the shaft adjacent the bearing assembly, and may extend into the cavity to direct oil against the housing inside the cavity to cool the housing.

Variation 18 may include a product according to variation 17 wherein the flinger may include a cupped section that opens toward the turbine wheel and ends at an outer rim. The cupped section may have a back and the outer rim may be disposed in the cavity. The housing may include an oil jet directed at the back of the cupped section of the flinger.

Variation 19 may include a product according to variation 17 or 18 and may include a heat shield that may have a central opening and a peripheral rim flange that may have a number of tabs positioned against the bearing housing.

Variation 20 may include a product according to variation 19 wherein the heat shield may have an inner wall and an outer wall with an air gap defined between the inner wall and the outer wall.

The above description of select variations within the scope of the invention is merely illustrative in nature and, thus, variations or variants thereof are not to be regarded as a departure from the spirit and scope of the invention.

What is claimed is:

1. A product for use with a turbocharger system comprising: a bearing housing; a first flange extending from the bearing housing in a radial direction, the first flange configured to connect with a compressor housing; a second flange on the bearing housing configured to connect with a turbine housing; a bearing cavity extending along a central axis of the bearing housing, the bearing cavity being configured to receive a bearing assembly; a turbine end spacer wall of the bearing housing extending in the radial direction, the turbine end spacer wall defining an end opening that opens to the bearing cavity; a first wall section of the bearing housing extending in an axial direction toward the turbine housing and the first wall section extending around the bearing cavity, the first wall section turning radially inward toward the central axis and connecting with the turbine end spacer wall; a second wall section extending in the axial direction toward the turbine wheel and the second wall section extending around the first wall section, the second wall section having a terminal end configured to engage with a heat shield; an air dam cavity defined between the first wall section and the second wall section; and a cooling fin positioned between the first and second flanges, the cooling fin extending from the bearing housing in the radial direction and extending away from the central axis, and the cooling fin extending circumferentially around a majority of the bearing housing, wherein the bearing housing includes a number of cooling pockets that are disposed in an annular configuration around the first flange, the cooling pockets located on an outside of the bearing housing.

2. The product according to claim 1 wherein the air dam extends into the bearing housing from the terminal end of the second wall section toward the compressor flange and past the cooling fin.

3. The product according to claim 2 wherein the cooling fin is a first cooling fin and wherein the housing includes a second cooling fin positioned between the first and second flanges, the second cooling fin extending from the bearing housing in the radial direction and away from the central axis, and the second cooling fin extending circumferentially around a majority of the bearing housing.

4. The product according to claim 1 wherein a cavity is defined by the bearing housing at a juncture of the first wall section and the turbine end spacer wall, the cavity extending circumferentially around the central axis.

5. A product for use with a turbocharger system comprising: a bearing housing; a first flange extending from the bearing housing in a radial direction, the first flange configured to connect with a compressor housing; a second flange on the bearing housing configured to connect with a turbine housing; a bearing cavity extending along a central axis of the bearing housing, the bearing cavity being configured to receive a bearing assembly; a turbine end spacer wall of the bearing housing extending in the radial direction, the turbine end spacer wall defining an end opening that opens to the bearing cavity; a first wall section of the bearing housing extending in an axial direction toward the turbine housing and the first wall section extending around the bearing cavity, the first wall section turning radially inward toward the central axis and connecting with the turbine end spacer wall; a second wall section extending in the axial direction toward the turbine wheel and the second wall section extending around the first wall section, the second wall section having a terminal end configured to engage with a heat shield; an air dam cavity defined between the first wall section and the second wall section; and a cooling fin positioned between the first and second flanges, the cooling fin extending from the bearing housing in the radial direction and extending away from the central axis, and the cooling fin extending circumferentially around a majority of the bearing housing, wherein a cavity is defined by the bearing housing at a juncture of the first wall section and the turbine end spacer wall, the cavity extending circumferentially around the central axis, and wherein the bearing housing includes an oil jet opening to the cavity, the oil jet directed an angle toward the central axis.

6. A product for use with a turbocharger system comprising: a housing having a bearing opening; a bearing assembly positioned in the bearing opening, the bearing assembly having a central opening that extends through the bearing assembly; a shaft extending through the central opening, the shaft having a first end and a second end; a compressor wheel fixed to the first end of the shaft; a turbine wheel fixed to the second end of the shaft; wherein the shaft includes a bearing segment near the second end; wherein the housing includes a turbine end spacer wall defining an end opening; wherein the bearing segment is positioned in the end opening with a seal ring positioned between the bearing segment and the housing inside the end opening; wherein the housing includes a first wall section extending toward the turbine wheel, and the first wall section extending around the bearing opening, the first wall section turning radially inward and connecting with the turbine end spacer wall; wherein the housing includes a second wall section extending toward the turbine wheel, and the second wall section extending around the first wall section, the second wall section having a terminal end; a heat shield having an inner opening through which the shaft extends, the heat shield having an outer flange that is engaged with the terminal wall, wherein the heat shield substantially closes an air dam defined between the housing and the heat shield, and the air dam defined between the first wall section and the second wall section; wherein an oil used in the bearing assembly is separated from the air dam by the seal ring, wherein the housing includes at least one fin that extends radially outward from the housing and around the air dam, the air dam and the at least one fin configured to direct heat through the second wall section and through the at least one fin and away from the bearing assembly, and wherein the housing includes a number of cooling pockets disposed in an annular configuration, and the cooling pockets located on an outside of the housing.

7. The product according to claim 6 wherein the heat shield includes an inner wall disposed toward the housing and the heat shield includes an outer wall disposed toward the turbine wheel, with an air gap defined between the inner wall and the outer wall.

8. The product according to claim 6 wherein the flange of the heat shield includes a number of extending tabs configured to minimize a contact area between the heat shield and the housing to minimize a heat transfer between the heat shield and the housing.

9. The product according to claim 6 wherein an axis is defined by a centerline of the shaft, wherein the air dam extends into the housing away from the turbine wheel and beyond a radially extending line that passes through the fin and the axis.

10. A product for use with a turbocharger system comprising: a housing having a bearing opening; a bearing assembly positioned in the bearing opening, the bearing assembly having a central opening that extends through the bearing assembly; a shaft extending through the central opening, the shaft having a first end and a second end; a compressor wheel fixed to the first end of the shaft; a turbine wheel fixed to the second end of the shaft; wherein the shaft includes a bearing segment near the second end; wherein the housing includes a turbine end spacer wall defining an end opening; wherein the bearing segment is positioned in the end opening with a seal ring positioned between the bearing segment and the housing inside the end opening; wherein the housing includes a first wall section extending toward the turbine wheel, and the first wall section extending around the bearing opening, the first wall section turning radially inward and connecting with the turbine end spacer wall; wherein the housing includes a second wall section extending toward the turbine wheel, and the second wall section extending around the first wall section, the second wall section having a terminal end; a heat shield having an inner opening through which the shaft extends, the heat shield having an outer flange that is engaged with the terminal wall, wherein the heat shield substantially closes an air dam defined between the housing and the heat shield, and the air dam defined between the first wall section and the second wall section; wherein an oil used in the bearing assembly is separated from the air dam by the seal ring, further comprising a flinger positioned around the shaft near the turbine end spacer wall, the flinger including a cupped section that opens toward the turbine end spacer wall and ends at an outer rim, the cupped section having a back; and the outer rim disposed in a cavity defined by the housing, the cavity defined at a juncture of the first wall section and the turbine end spacer wall, and wherein the housing includes an oil jet directed at the back of the cupped section of the flinger to direct oil from the flinger at the housing, inside the cavity, to cool the housing around the juncture of the first wall section and the turbine end spacer wall.

11. The product according to claim 10 wherein the cavity includes a drain and wherein the flinger is shaped to direct oil away from the bearing segment of the shaft so that oil proceeds through the drain and the air dam remains free of oil.

12. The product according to claim 11 wherein the bearing assembly includes an inner race and the flinger includes an annular section that is enlarged, the annular section captured between the inner race and the bearing section of the shaft.

13. A product for use with a turbocharger system comprising: a bearing housing; a bearing assembly positioned in the bearing housing, the bearing assembly lubricated with oil, a rotatable shaft extending through the bearing assembly; a turbine wheel connected to the shaft; wherein a cavity is defined by the bearing housing between the bearing assembly and the turbine wheel; and an oil flinger positioned on the shaft adjacent the bearing assembly, the oil flinger extending into the cavity, the oil flinger configured to direct oil against the housing inside the cavity to cool the housing, wherein the flinger includes a cupped section that opens toward the turbine wheel and ends at an outer rim, the cupped section having a back; and the outer rim is disposed in the cavity, wherein the housing includes an oil jet directed at the back of the cupped section of the flinger.

14. The product according to claim 13 further comprising a heat shield having a central opening and having a peripheral rim flange, the peripheral rim flange having a number of tabs positioned against the bearing housing.

15. The product according to claim 14 wherein the heat shield has an inner wall and an outer wall, with an air gap defined between the inner wall and the outer wall.

16. A product for use with a turbocharger system comprising: a bearing housing extending between a first flange adapted to connect with a compressor housing and a second flange adapted to connect with a turbine housing, wherein the turbine housing defines a volute adapted to channel exhaust gases, wherein the bearing housing has a cooling fin extending away from the bearing housing in a radial direction, the cooling fin extending around a majority of the bearing housing and positioned between the first and second flanges; a bearing assembly positioned in the bearing housing; a shaft extending through the bearing assembly, the shaft configured to rotate; a turbine wheel connected to the shaft; wherein an air dam is defined by the bearing housing and the air dam is configured to direct heat from the exhaust gases through the bearing housing and away from the bearing assembly and toward the cooling fin, the air dam extending away from the turbine wheel and into the bearing housing and terminating at a blind end, the blind end located further from the exhaust gases than the cooling fin, the air dam inhibiting conduction of heat.

* * * * *